US 8,502,855 B2

(12) United States Patent
Lindstrom et al.

(10) Patent No.: US 8,502,855 B2
(45) Date of Patent: Aug. 6, 2013

(54) CODEC NEGOTIATION

(75) Inventors: Michael Nils Olov Lindstrom, Tullinge (SE); Andreas Witzel, Herzogenrath (DE); Jan Erik Lindquist, Älvsjö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 882 days.

(21) Appl. No.: 12/597,711

(22) PCT Filed: Apr. 28, 2008

(86) PCT No.: PCT/EP2008/055154
§ 371 (c)(1),
(2), (4) Date: Jan. 6, 2010

(87) PCT Pub. No.: WO2008/132199
PCT Pub. Date: Nov. 6, 2008

(65) Prior Publication Data
US 2010/0134590 A1    Jun. 3, 2010

Related U.S. Application Data

(60) Provisional application No. 60/194,053, filed on Apr. 26, 2007.

(51) Int. Cl.
*H04N 7/14* (2006.01)
(52) U.S. Cl.
USPC ............. 348/14.01; 348/14.02; 370/352

(58) Field of Classification Search
USPC ............. 348/14.01; 370/260, 261, 352
See application file for complete search history.

(56) References Cited

U.S. PATENT DOCUMENTS

| | | | |
|---|---|---|---|
| 2005/0091392 A1* | 4/2005 | Gesswein et al. | 709/231 |
| 2007/0129052 A1* | 6/2007 | Jabri et al. | 455/403 |
| 2007/0297339 A1* | 12/2007 | Taylor et al. | 370/248 |
| 2007/0297352 A1* | 12/2007 | Jabri et al. | 370/261 |
| 2008/0037522 A1* | 2/2008 | Rasanen | 370/352 |
| 2010/0118778 A1* | 5/2010 | Ranke et al. | 348/14.02 |
| 2010/0277562 A1* | 11/2010 | Jabri et al. | 348/14.01 |

OTHER PUBLICATIONS

3GPP TSG-CT WG3 Meeting #44, Beijing, China Apr. 7-11, 2007: "Change Request 29.163 CR 140 rev 3, Version 7.6.0, Media oriented negotiation acceleration" Internet Citation, [Online] Apr. 25, 2007, pp. 1-16.

* cited by examiner

*Primary Examiner* — Stella Woo

(57) ABSTRACT

A method of interworking CS (Circuit Switched) video calls with video calls using IP multimedia protocols is provided. According to the method, an interworking function receives signalling comprising an indication of the codec capability of a CS terminal involved in the CS video call, as part of a MONA (Media Oriented Negotiation Acceleration) negotiation. Thereafter IP codec negotiation is initiated. And thereafter the MONA negotiation is continued and/or completed. Thus the codec capabilities and/or preferences of the CS terminal can be taken into account during the IP codec negotiation with the IP endpoint.

41 Claims, 11 Drawing Sheets

CODEC NEGOTIATION

This application claims the benefit of U.S. Provisional Application No. 60/194,053, filed Apr. 26, 2007, the disclosure of which is fully incorporated herein by reference.

TECHNICAL FIELD

The present invention relates to improvements in telecommunication. The invention finds particular application in the way in which CS (Circuit Switched) video calls are interworked towards video calls using IP multimedia protocols.

BACKGROUND

Various abbreviations are used in the present specification. These are listed and explained towards the end of the description.

Referring to FIG. 1, 3G video telephony of today supports call scenarios both between two mobile clients as well as between a 3G mobile 1 and an IP client 2. Video telephony services supported include interactive calls, streaming portals, video mail and multi-party calls.

The communication protocol used is the 3G-324M standard, which is an adaptation of the ITU-T H.324 standard (Terminal for low bit rate multimedia communication) to enable 3G conversational multimedia services over existing infrastructures of circuit switched (CS) networks. The 3G-324M architecture is defined by 3GPP in the 3G TS 26.111 standard.

The architecture defines audio and video codecs supported, together with the control signalling protocol (H.245) used to establish the multimedia communication. The control signalling is multiplexed together with the audio and video media using the H.223 multiplexing protocol.

The interworking functionality between the CS and the IP domain is handled by a CS-IP gateway 3. The CS-IP gateway 3 may be implemented using the H.248 architecture, where control signalling is handled by a Media Gateway Control Function (MGCF) 4 and media by a Media Gateway (MG) 5. CS endpoint 1 communicates with CS-IP gateway 3 via a RAN 6.

The control signalling used in the IP domain may be SIP, H.323 or RTSP, and media may be transported using the RTP protocol.

It has been appreciated that 3G video telephony services may suffer from having long call setup times due to the fact that the H.245 call establishment procedure results in significant signalling between the endpoints such as 1 and 2.

A recent update to the ITU-T H.324 standard is the introduction of Annex K, which describes an optional procedure named MONA "Media oriented negotiation acceleration procedure" comprising three complementary methods (or protocols) for significantly reducing delay in H.324 call setup. The methods are:

A fast channel setup mechanism, MPC "Media Preconfigured Channel". This mechanism does not wait for capability exchange (i.e. the end points do not exchange information with each other as regards their capabilities) but requires a fallback if the initial media transmission attempts do not comply with the capability of the remote end when this information is available.

A flexible accelerated channel setup method, SPC "Signalling Preconfigured Channel" that depends on an initial exchange of preferences and the execution of a common inference algorithm.

An accelerated H.245 setup method, ACP "Accelerated H.245 procedures" as a simple and reasonably fast technique in cases where the other two methods are not suitable.

Interoperation with legacy terminals not supporting MONA is also preserved across the procedures.

Annex K has defined the following MONA terminal classes to indicate which of the three methods a specific terminal implementation supports:
Class I: SPC+MPC+ACP
Class II: MPC+ACP
Class III: SPC+ACP FIG. 2 shows features of the 3G-324M standard including the MONA functionality.

It has been considered to introduce MONA support in the CS-IP interworking gateway 3 (MGCF 4 and MG 5) since it would be desirable to reduce call setup times for CS-IP multimedia calls and also to minimize signalling between the MGCF 4 and the MG 5 as a result of the reduced number of messages exchanged between MONA capable terminals.

A main focus of the present invention is CS-IP interworking when using any of the MONA mechanisms MPC, SPC or ACP on the CS side (i.e. if endpoint 1 is a MONA Class I, II or III terminal). A brief overview of the MONA procedure as specified in Annex K is provided below. A more detailed description can be found at ITU-T recommendation H.324 Annex K, which is hereby incorporated by reference.

If a terminal supports the MPC mechanism, then this mechanism may be used on the CS side. According to the MPC mechanism, once the CS bearer is established, the CS terminal starts sending preference messages including MPC codec preference per direction. The CS terminal may also start sending media on any of the preconfigured MPC channels before receiving any information of the MPC capability of the remote terminal. In case the remote terminal supports MPC and the codec preferred by the CS terminal, the channel is successfully established.

If a terminal supports the SPC mechanism, then this mechanism may be used on the CS side. According to this mechanism, once the CS bearer is established, the CS terminal sends its MOS (Media Oriented Setup) Request using the SPC (see FIG. 3). The MOS Request transmissions should be repeated until a MOS requestAck is detected, or one of the fallback conditions is fulfilled.

When a MOS Request is detected and decoded successfully from the MOS SPC, the terminal accepts it by beginning the transmission and processing of media data. MOS requestAck shall be sent on receiving every MOS Request.

If MOS is completed successfully, opened logical channels operate immediately, as shown in FIG. 3.

MONA Fallback is specified in K.7.2 of Annex K. The following additional conditions shall also initiate a fallback from MOS:

A normal H.245 TerminalCapabilitySet message with empty genericControlCapability containing MOS OID after completion of the MOS procedure.

A terminal does not detect a valid MOS request, or does not accept the ICM, within a multiple of the network round trip delay (RTD) period, for example within three RTDs.

An overview over the ACP mechanism is not provided here as one skilled in the art will be familiar with this.

A main objective for a CS-IP interworking function 3 supporting MONA is to facilitate end-to-end codec negotiation between the endpoints 1, 2, in order to achieve best possible media quality. Supporting end-to-end codec negotiation will also minimize utilization of expensive transcoding resources in the interworking gateway 3.

It has been appreciated that call signalling interworking between a MONA and an IP endpoint (i.e. SIP, H.323 or RTSP endpoint) via a CS-IP gateway is problematic for calls originated by the CS terminal using both MPC and SPC. Problems arise in the MPC case since media channels are opened immediately once media is received on a supported preconfigured channel. Problems arise in the SPC case since the SPC procedure has strict timing constraints.

The problem encountered in the SPC case will now be explained in more detail. As stated in H.324 Annex K, a SPC capable endpoint shall send its MOS request once the CS bearer is established. This is especially challenging for CS→IP calls if end-to-end codec negotiation is to take place.

FIGS. 4 and 6 show two CS→IP call sequences showing two alternative signalling interworking examples for how a call between a MONA SPC endpoint (such as 1) and a SIP endpoint (such as 2) can be established according to the prior art, and FIG. 5 (which is similar to FIG. 4) shows a CS→IP call sequence showing a signalling interworking example for how a call between a MONA MPC endpoint (such as 1) and a SIP endpoint (such as 2) can be established according to the prior art.

In the CS to IP call establishment example sequences of FIGS. 4 and 5 MONA SPC negotiation and MONA MPC negotiation is finished without knowledge of the codec capability of the SIP endpoint, i.e. the codec capability of the SIP endpoint is not taken into account during the MONA SPC or MPC, negotiation, which takes place entirely on the CS side (steps 4. to 7. in FIG. 4; steps 4. and 5. in FIG. 5). The negotiated codec on the CS side is used as preference in the SIP negotiation (steps 8. and 9.) but in case this codec is not supported by the SIP endpoint, CS-IP gateway transcoding will be required.

The signalling interworking example shown in FIG. 6 includes some form of end-to-end codec negotiation since SIP negotiation is initiated before the CS bearer is established. The codecs preferred by the SIP endpoint (communicated in step 9. in FIG. 6) are then used as preference in step 4. of MONA MPC/SPC negotiation (steps 4. to 7.). In case the MONA endpoint does not accept the selected codec on the IP side, a SIP re-negotiation has to be initiated (steps 8a. and 9a), possibly resulting in that transcoding resources within the CS-IP gateway have to be deployed. Only SPC negotiation is shown in FIG. 6, i.e. the interworking gateway of this example acts as a MONA class III terminal. It will be clear to one skilled in the art how this example is to be adapted for the purpose of MPC negotiation.

SUMMARY

The present inventors have appreciated the disadvantages mentioned above in connection with the prior art techniques illustrated in FIGS. 4 to 6. The present invention has been made to address the above problems. It is an object of at least preferred embodiments of the present invention to provide a mechanism to achieve end-to-end codec negotiation between a CS MONA endpoint and an IP endpoint with a minimum of CS and IP signalling.

It is a further such object to provide a CS-IP interworking function method for achieving end-to-end codec negotiation in a CS to IP call between a MONA endpoint and an IP endpoint. In the case of a MONA class I/III endpoint (using SPC) the solution involves waiting for the SPC MOS request before initiating IP codec negotiation. More generally, regardless of what type MONA endpoint is, the solution involves waiting for an indication of the CS side codec capability before initiating IP codec negotiation.

A method of interworking CS (Circuit Switched) video calls with video calls using IP multimedia protocols is provided. According to the method, an interworking function receives signalling comprising an indication of the codec capability of a CS terminal involved in the CS video call, as part of a MONA (Media Oriented Negotiation Acceleration) negotiation. Thereafter IP codec negotiation is initiated. And thereafter the MONA negotiation is continued and/or completed. Thus the codec capabilities and/or preferences of the CS terminal can be taken into account during the IP codec negotiation with the IP endpoint.

The interworking function may comprise several entities (such as a MGCF and a MG) cooperating with each other.

Another method of interworking CS (Circuit Switched) video calls with video calls using IP multimedia protocols is provided, which comprises end-to-end codec negotiation. The end-to-end codec negotiation involves, at an interworking function, receiving signalling comprising an indication of the codec capability of a CS terminal involved in the CS video call, as part of a MONA negotiation. Thereafter IP codec negotiation is initiated. Again, the codec capabilities of the CS terminal can be taken into account during the IP codec negotiation since this technique involves end-to-end codec negotiation.

Achieving end-to-end codec negotiation between the endpoints may facilitate negotiation and usage of the common codec with the highest media quality (e.g. AMR-WB and H.264). It may further minimize utilization of expensive transcoding resources in the CS-IP interworking gateway.

It is envisaged that the signalling comprises an indication of a codec preference of said CS terminal. The IP codec negotiation comprises the interworking function negotiating with an IP endpoint which codecs should be used for a particular call. As part of this, the codec capabilities and/or, where available, the codec preferences of the CS terminal can be taken into account.

It is envisaged that a CS bearer is established before the signalling is received. Preferably, the method is tolerant to a delay caused by the IP codec negotiation.

The signalling may comprise an SPC MOS request, and the MONA negotiation may comprise an SPC negotiation.

Preferably, receipt of an acknowledgement of the SPC MOS request causes the SPC negotiation to be considered to be ongoing. Further, receipt of an acknowledgement of the SPC MOS request may cause a fallback to a procedure other than SPC to be inhibited or deferred.

The signalling may comprise a MONA PM (Preference Message).

The signalling may comprise an MPC offer, and the MONA negotiation may comprise an MPC negotiation. Receipt of an acknowledgement of the MPC offer preferably causes the MPC negotiation to be considered to be ongoing. The receipt of an acknowledgement of the MPC offer preferably causes a fallback to a procedure other than MPC to be inhibited or deferred.

The method may further comprise sending a TDM idle pattern towards the CS terminal on receipt of the MPC offer at the interworking function. It may also comprise detecting from the signalling the type of MONA terminal which the CS terminal acts as.

The method may comprise causing a fallback to ACP. This may comprise the interworking function sending a MONA PM offer towards the CS terminal. This MONA PM may indicate SPC support without any MPC codec offer. Alternatively, the MONA PM may comprise an MPC codec offer without indicating support for SPC. The MONA PM sent by the interworking function towards the CS terminal in order to cause the fallback to ACP may comprise an MPC codec offer which is an inverted copy of an MPC offer comprised in the signalling.

It is envisaged that the interworking function sends to the CS terminal an indication of the codecs to be used for a particular call only after it has received an indication of the codec capability of the IP terminal as part of the IP codec negotiation.

Apparatus for enabling interworking of CS (Circuit Switched) video calls with video calls using IP multimedia protocols is also provided. The apparatus is arranged to receive signalling comprising an indication of the codec capability of a CS terminal involved in the CS video call, as part of a MONA negotiation. Thereafter the apparatus initiates IP codec negotiation. And thereafter it continues and/or completes the MONA negotiation.

Another apparatus for enabling interworking of CS (Circuit Switched) video calls with video calls using IP multimedia protocols is provided. The apparatus is arranged to support end-to-end codec negotiation. To this end it is arranged to receive signalling comprising an indication of the codec capability of a CS terminal involved in the CS video call, as part of a MONA negotiation, and thereafter it initiates IP codec negotiation. The apparatus may, for example, comprise an interworking function.

The apparatus may comprise means for delaying the sending to the CS terminal of an indication of the codecs to be used for a particular call. Preferably, the delaying means is arranged to send to the CS terminal the indication of the codecs to be used for the particular call only after it has received an indication of the codec capability of the IP terminal as part of the IP codec negotiation.

A terminal for use in a telecommunication system is also provided. The terminal is able to support MONA SPC. It comprises means for preventing, delaying or inhibiting a fallback to a call establishment mechanism other than SPC, at least for a first period of time, under specified conditions, wherein the fallback would not be prevented, delayed or inhibited in the absence of such means. In other words, fallback would normally occur in some situations, but because of the means included in the terminal, and only because of the means included in the terminal, the fallback is prevented, delayed or inhibited, at least for a first period of time, as long as specified conditions are fulfilled.

Another terminal for use in a telecommunication system is provided, which terminal is able to support MONA SPC. The terminal is arranged, when one or more first conditions are met, to cause, initiate or perform a fallback to a call establishment mechanism other than SPC. However, the terminal comprises means for preventing, delaying or inhibiting such a fallback, at least for a first period of time, when one or more second conditions are met despite the one or more first conditions being met.

For example, a terminal for use in a telecommunication system is provided, which terminal is able to support MONA SPC. The terminal is arranged to initiate fallback to a call establishment mechanism other than SPC when one or more conditions are met. However, the terminal is arranged not to initiate the fallback, at least for a first period of time, when it has received a valid MOS requestAck message. The terminal is arranged not to initiate the fallback when it has received a valid MOS requestAck message despite one or more other fallback conditions being fulfilled.

Another terminal for use in a telecommunication system is provided, which terminal is able to support MONA SPC. The terminal is arranged to delay the sending of an acknowledgement of a MONA Preference Message so as to prevent, delay or inhibit a fallback to a call establishment mechanism other than SPC, at least for a first period of time.

Another terminal for use in a telecommunication system is provided, which terminal is able to support MONA SPC. The terminal is arranged to send signalling indicative of the fact that SPC negotiation has been established/initiated and that a first MONA offer is pending.

Another terminal for use in a telecommunication system is provided, which terminal is able to support MONA SPC. The terminal is arranged to receive signalling indicative of the fact that SPC negotiation has been established/initiated and that a first MONA offer is pending. On receipt of such signalling, the terminal is arranged to prevent, delay or inhibit a fallback to a call establishment mechanism other than SPC, at least for a first period of time.

A method of operating a terminal for use in a telecommunication system is also provided. The terminal is able to support MONA SPC. As part of the method, the terminal causes, initiates or performs a fallback to a call establishment mechanism other than SPC when one or more first conditions are met. However, the terminal prevents, delays or inhibits such a fallback, at least for a first period of time, when one or more second conditions are met despite the one or more first conditions being met.

Another method of operating a terminal for use in a telecommunication system is provided. The terminal is able to support MONA SPC. As part of the method, when one or more conditions are met, the terminal is arranged to initiate fallback to a call establishment mechanism other than SPC. However, the terminal does not initiate the fallback, at least for a first period of time, when it has received a valid MOS requestAck message. The terminal does not initiate the fallback when it has received a valid MOS requestAck message despite one or more other fallback conditions being fulfilled.

Another method of operating a terminal for use in a telecommunication system is provided. The terminal is able to support MONA SPC. As part of the method, the terminal delays the sending of an acknowledgement of a MONA Preference Message so as to prevent, delay or inhibit a fallback to a call establishment mechanism other than SPC, at least for a first period of time.

Another method of operating a terminal for use in a telecommunication system is provided. The terminal is able to support MONA SPC. As part of the method, the terminal sends signalling indicative of the fact that SPC negotiation has been established/initiated and that a first MONA offer is pending.

Another method of operating a terminal for use in a telecommunication system is provided. The terminal is able to support MONA SPC. As part of the method, the terminal receives signalling indicative of the fact that SPC negotiation has been established/initiated and that a first MONA offer is pending. On receipt of such signalling, the terminal prevents, delays or inhibits a fallback to a call establishment mechanism other than SPC, at least for a first period of time.

Another method of operating a terminal for use in a telecommunication system is provided. The terminal is able to support MONA SPC. As part of the method a Round-Trip Delay is defined based on the time it takes until a MONA Preference Message (PM) acknowledgment is received.

BRIEF DESCRIPTION OF THE DRAWINGS

Some preferred embodiments of the invention will now be described by way of example only and with reference to the accompanying drawings, in which.

DETAILED DESCRIPTION

Three different embodiments are described here, which aim to achieve end-to-end codec negotiation in CS to IP calls using MONA. The decision as to which embodiment should be used may depend on a choice of implementation and/or on the type of MONA terminal which the MONA endpoint and the Interworking Node (or Interworking Gateway or Interworking Function) acts as.

Embodiment 1 (Using MONA SPC)

Figure 1:
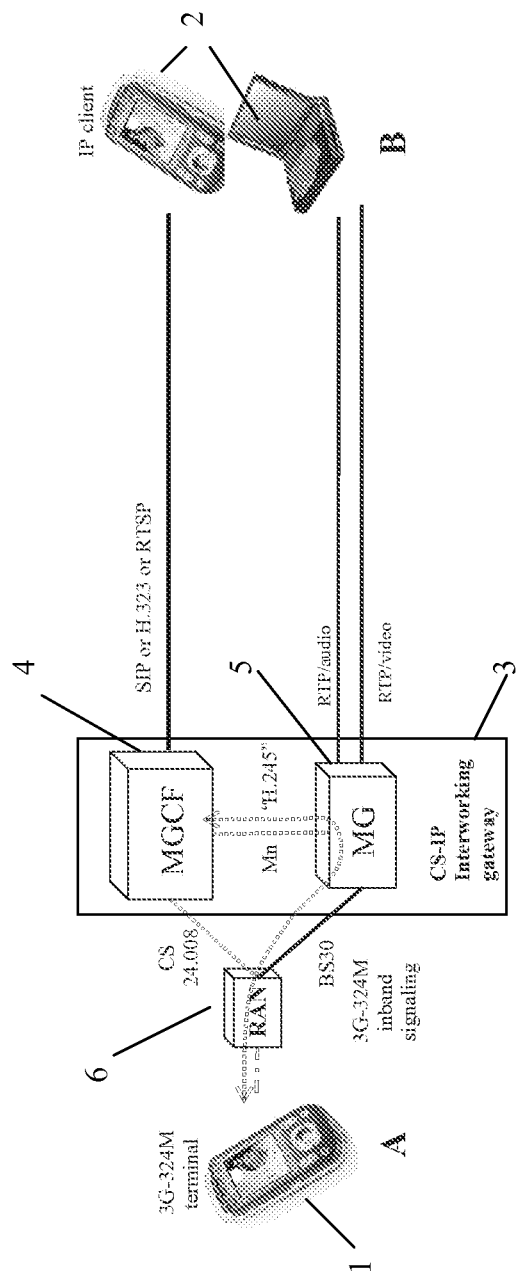
FIG. 1 illustrates various nodes involved in CS-IP video telephony interworking.
Figure 2:
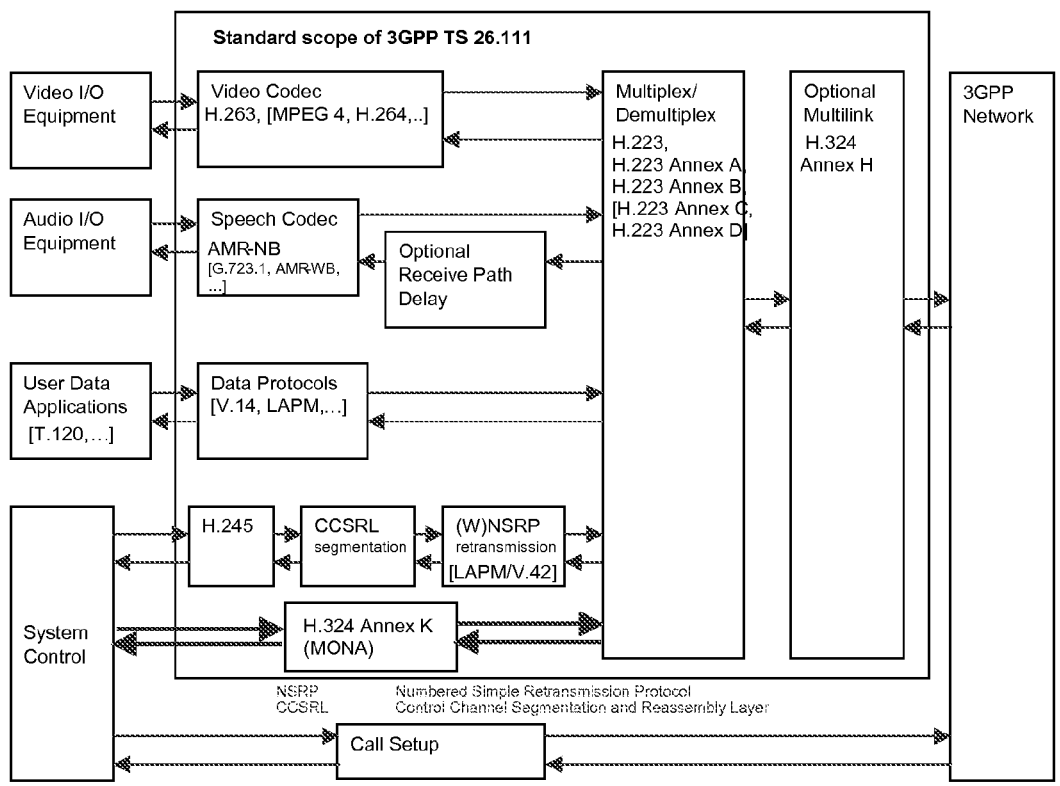
FIG. 2 illustrates the standard scope of 3 GPP TS 26.111, including how MONA is integrated into the 3 GPP video framework of TS 26.111.
Figure 3:
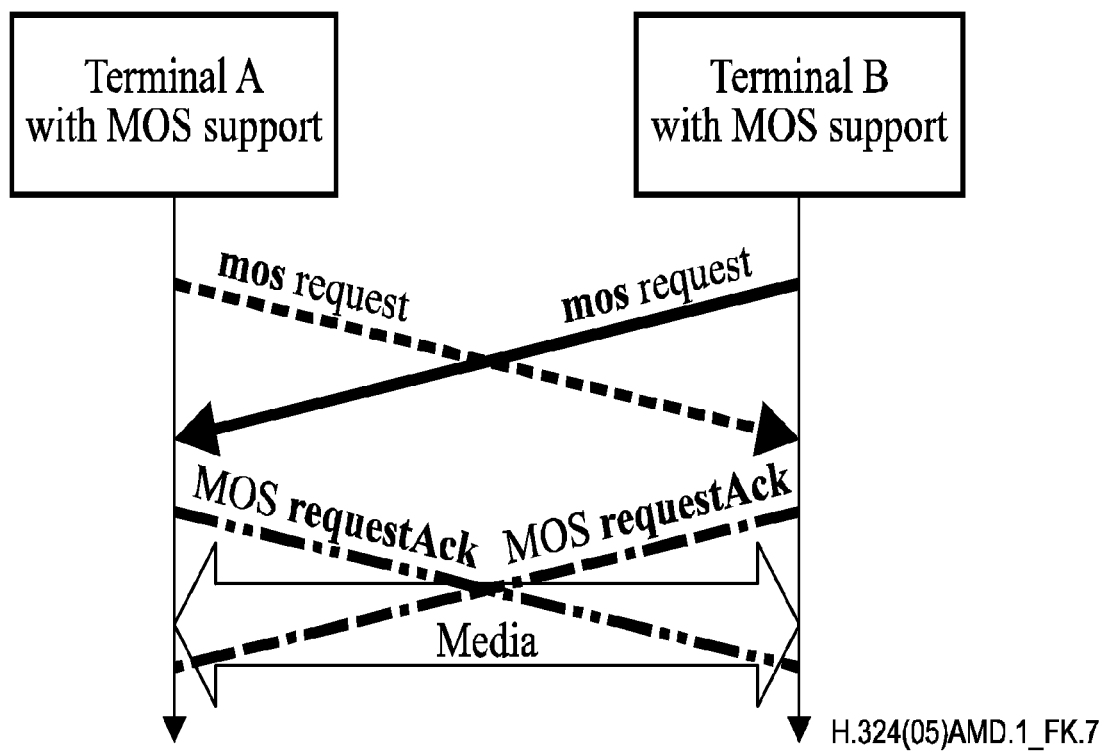
FIG. 3 illustrates the MOS call flow according to H.324.
Figure 4:
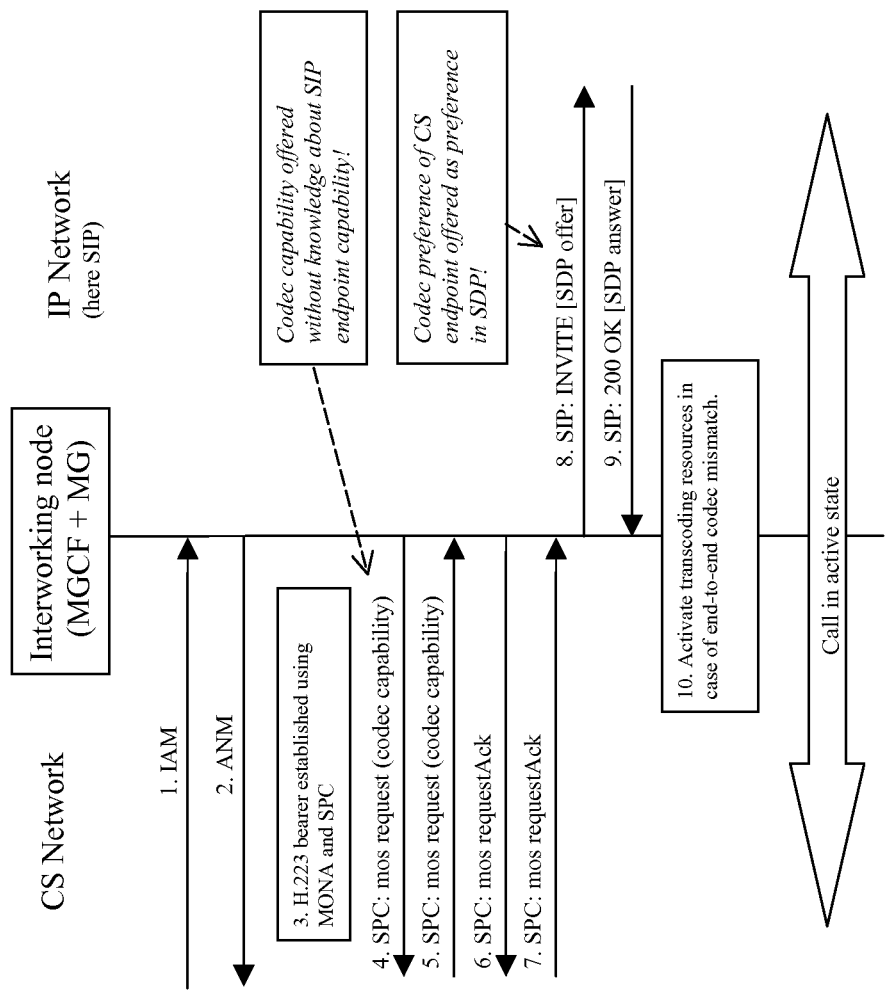
FIG. 4 illustrates a CS to IP call establishment example sequence using MONA SPC according to the prior art.
Figure 5:
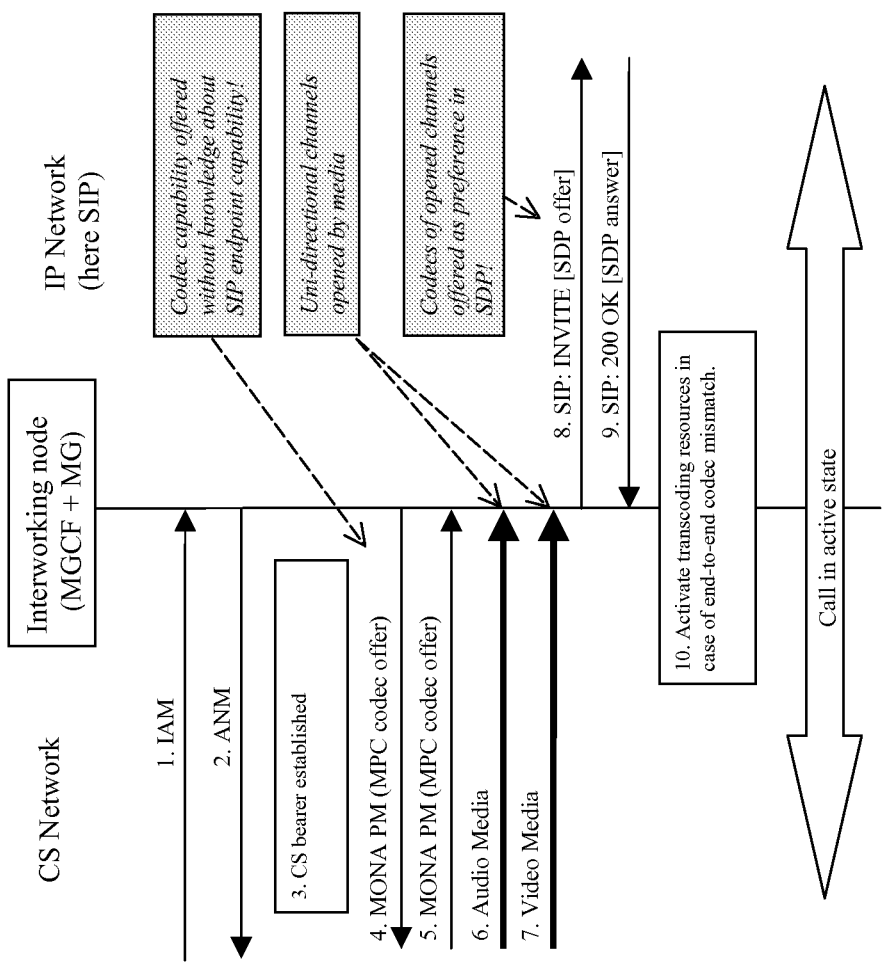
FIG. 5 illustrates a CS to IP call establishment example sequence using MONA MPC according to the prior art.
Figure 6:
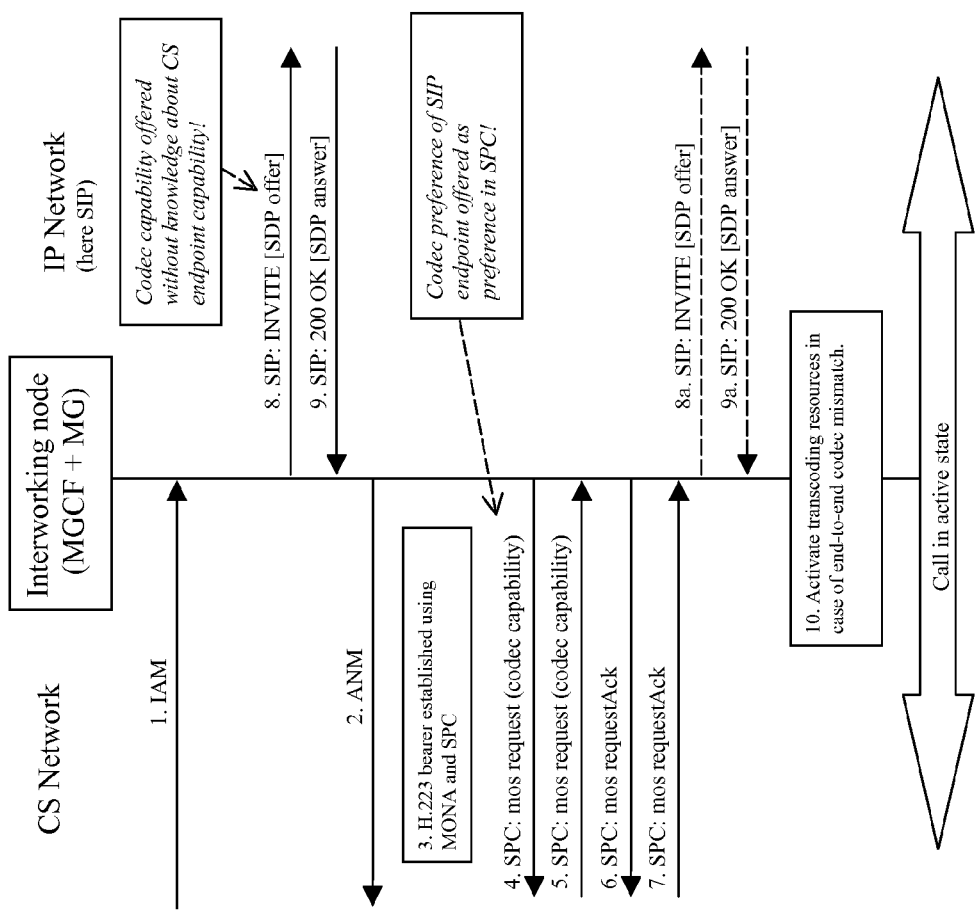
FIG. 6 illustrates another CS to IP call establishment example sequence using MONA SPC according to the prior art.
Figure 7:
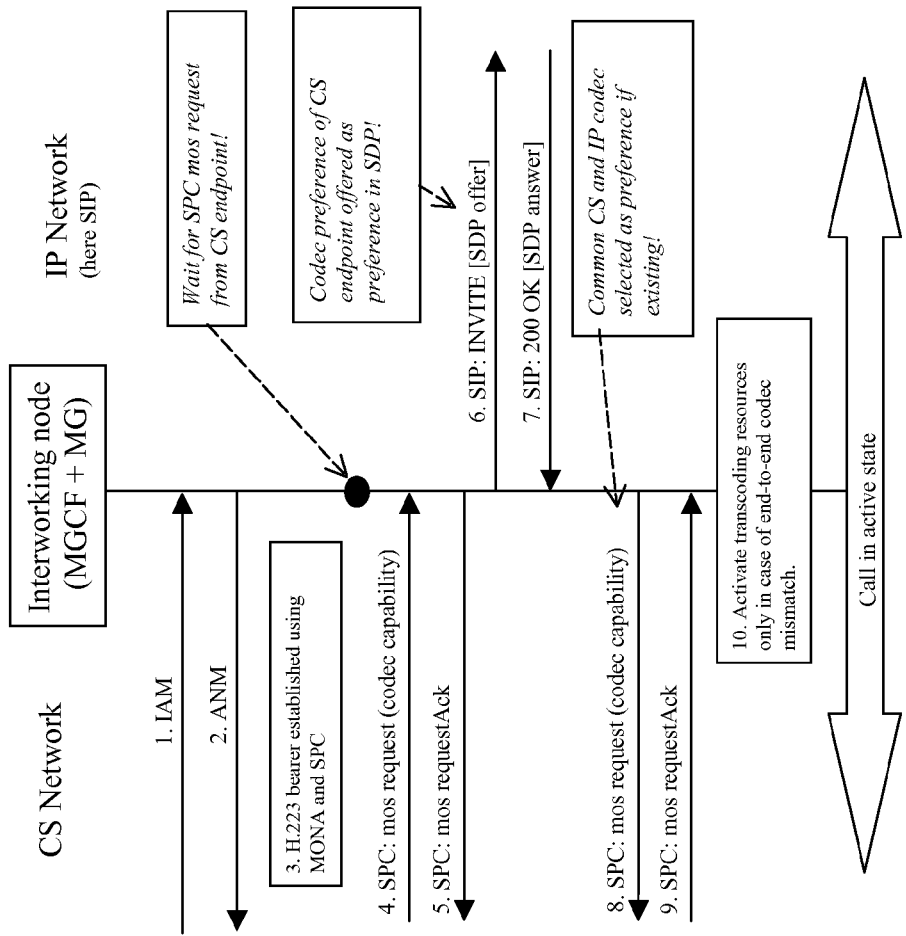
FIG. 7 illustrates a CS to IP call establishment example sequence using MONA SPC according to an embodiment of the present invention.

Referring to FIG. 7, the left hand side of the figure illustrates the signalling between CS endpoint 1 and the Interworking Node 3, i.e. the signalling on the CS side. The right hand part of FIG. 7 illustrates the signalling between the IP endpoint 2 and the Interworking Gateway 3, i.e. the signalling on the IP side.

The sequence starts at 1. with the CS endpoint sending an IAM to the Interworking Node. The Interworking Node responds with an ANM (2.) to the CS terminal. Next, a H. 223 bearer is established (3.) using MONA and SPC. The Interworking Node then waits for an SPC MOS request from the CS endpoint, i.e. does not proceed with IP negotiation without first having received the SPC MOS request. When the Interworking Node has received (4.) the SPC MOS request (which includes an indication of the codec capability of the CS endpoint) it acknowledges the request by sending (5.) an SPC MOS requestAck to the CS endpoint. The Interworking Node then also starts the negotiation on the IP side by sending (6.) a SIP INVITE message to the IP terminal. This SIP INVITE message includes an SDP offer, which comprises the codec preference of the CS endpoint. In this way the codec preference (and capability) of the CS endpoint can be taken into account during the negotiation between the Interworking Node and the IP endpoint. The Interworking Node may also include in the SDP offer any additional codecs for which it has transcoding capabilities. The IP endpoint then sends (7.) a SIP 200 OK message (i.e. the SDP answer) to the Interworking Node. As a result, codecs are selected which are suitable both for the CS and the IP side (if such common codecs exist), i.e. in accordance with the capabilities of the CS terminal and the IP terminal. That is, if a common codec exists which is supported both by the CS and the IP terminal then the Interworking Node would select this common codec. If there is a choice between several common codecs, then it would choose that codec which provides the best quality. If no such common codec exists then the Interworking Node would select a codec for which it has transcoding capabilities.

The Interworking Node then sends (8.) an SPC MOS request to the CS terminal. This SPC MOS request specifies which codec is to be used (per media type) on the CS side.

The CS terminal then sends (9.) an SPC MOS requestAck to the Interworking Node. The call is then in an active state. Active transcoding resources of the Interworking Node are only used in case of end-to-end codec mismatch.

It can hence be seen that the above technique aims to provide end-to-end codec negotiation between the endpoints. This is achieved by the Interworking Node waiting for the reception of a SPC MOS request from the CS endpoint before initiating IP endpoint signalling. As a result, the codec capabilities of the CS endpoint can be used in the IP endpoint negotiation.

Figure 10:
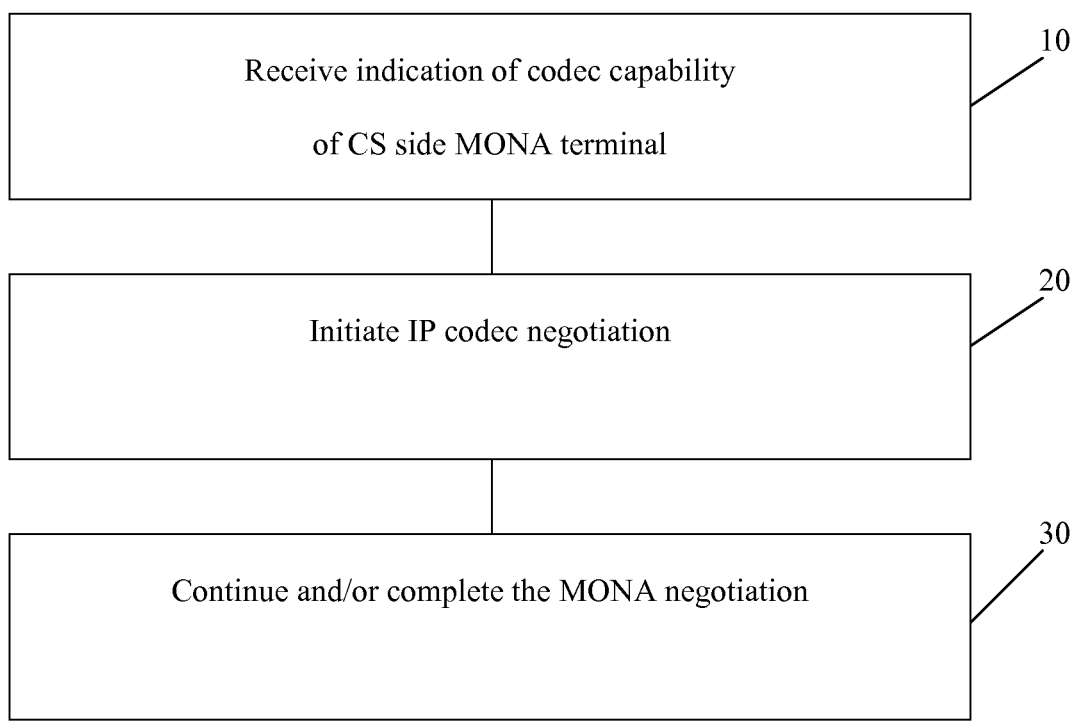
FIG. 10 illustrates a sequence of steps of a technique in accordance with an embodiment of the present invention.

Referring now to FIG. 10, this flowchart illustrates steps performed by the Interworking Node 3 according to embodiments of the present invention. As shown at 10, the Interworking Node receives an indication of the codec capability of the CS side MONA terminal, as part of a MONA negotiation. Thereafter, as shown at 20, the Interworking Node initiates IP codec negotiation. After this, at 30, the Interworking Node continues and/or completes the MONA negotiation.

Figure 11:
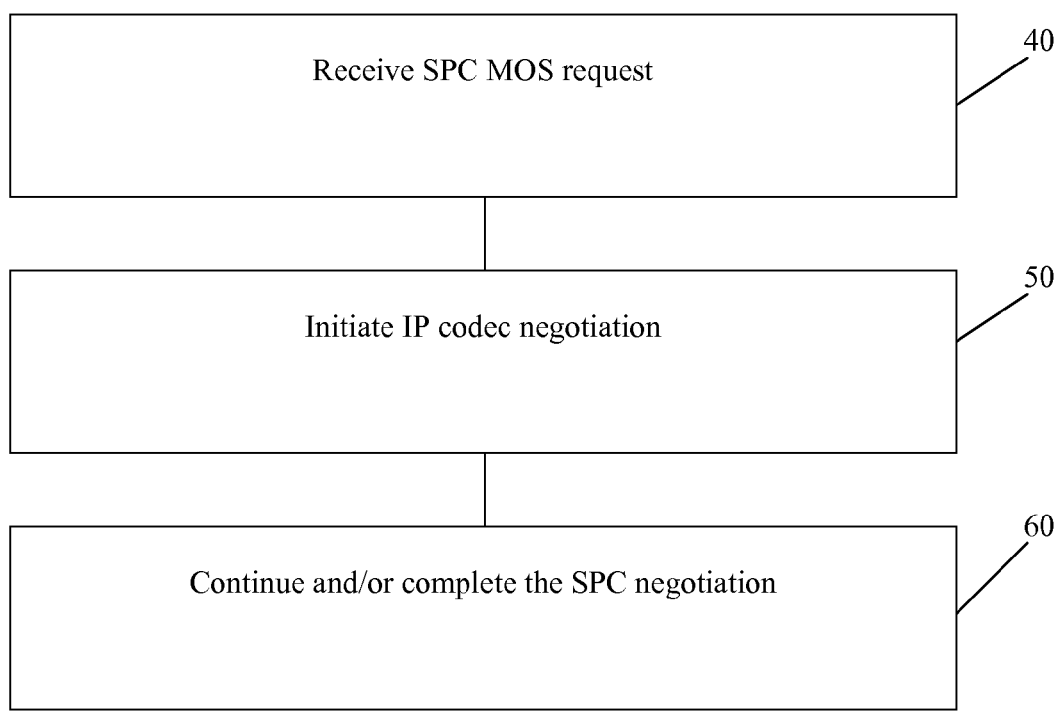
FIG. 11 illustrates a sequence of steps of a technique using MONA SPC according to an embodiment of the present invention.

FIG. 11 illustrates how the steps shown in FIG. 10 apply specifically to the case where the MONA negotiation is an SPC negotiation.

As shown at 40, the Interworking Node receives an SPC MOS request. Thereafter, as shown at 50, the Interworking Node initiates IP codec negotiation. After this, at 60, the Interworking Node continues and/or completes the SPC negotiation.

Referring both to FIGS. 7 & 11, under some circumstances the IP endpoint negotiation may take some time, which may, according to protocols currently in use, result in failure of the SPC negotiation due to a SPC fallback condition being fulfilled. The fallback condition here referred to, as stated in K.8.2 in Annex K, is that a terminal that does not receive a valid MOS request within a multiple of the network round trip delay (RTD) period (for example, three RTDs) shall consider SPC negotiation to have failed and initiate fallback to another call establishment mechanism.

Several solutions exist to address the above potential problem. Three solutions identified by the inventors are outlined below. A common feature of these solutions is the fact that they can be implemented by updating the Annex K specification, and all have the same purpose, i.e. to increase the time allowed for SPC negotiation in order to make it sustain the time required for IP negotiation.

The first solution involves updating the SPC fallback conditions as specified in section K.8.2 of Annex K to simplify CS-IP interworking. The proposed update is that the reception of a valid MOS requestAck shall be interpreted as an indication that SPC negotiation is ongoing and shall inhibit fallback to another procedure—at least for a period of time, e.g. for the duration of the particular video call in question. The following change (in bold style) to the second fallback condition is proposed:

"A terminal does not detect a valid MOS request or a valid MOS requestAck, or does not accept the ICM, within a multiple of the network round trip delay (RTD) period. Typically, three RTDs are adopted."

According to the second solution, which is a variant of the first solution, it is also possible to introduce a new 'SPC negotiation in progress' MOS message (similar to '180 Ringing' in SIP). In FIG. 7, this message would be sent instead of the SPC MOS requestAck at 5. Reception of such a 'SPC negotiation in progress' MOS message would again inhibit fallback to another procedure. [Q: I feel we should say a bit more about this, in particular when this "SPC negotiation in progress" message would be sent. Is it sent from the Interworking Node to the CS endpoint with step 5?]

The third solution involves updating the Annex K to state that the MONA SPC capable terminal shall measure the Round-Trip Delay based on the MONA Preference Message (PM) acknowledgment round-trip time.

MONA PM payload capability information includes two ACK-bits in which a MONA terminal can acknowledge reception of Preference Messages from the remote terminal. The third solution is based on the idea that the CS-IP interworking function deliberately delays PM acknowledgement in order to make MONA SPC negotiation tolerant to the delay introduced during the IP endpoint negotiation. In other words, if the Round-Trip Delay is based on the time it takes until a MONA Preference Message (PM) acknowledgment is received and the sending of the MONA Preference Message (PM) acknowledgment is delayed then the RTD is automatically lengthened. As a result, fallback is inhibited/delayed.

The proposed text to the Annex K for the third solution reads:

"The RTD value to use within the SPC fallback condition in K.8.2, shall be equal with the time between the reception of a PM with ACK value '01' to the reception of a PM with ACK value '10'."

Any one of these solutions can be used to ensure that MONA SPC negotiation sustain the time it takes to complete IP session establishment.

Embodiment 2 (Using MONA MPC)

Figure 8:
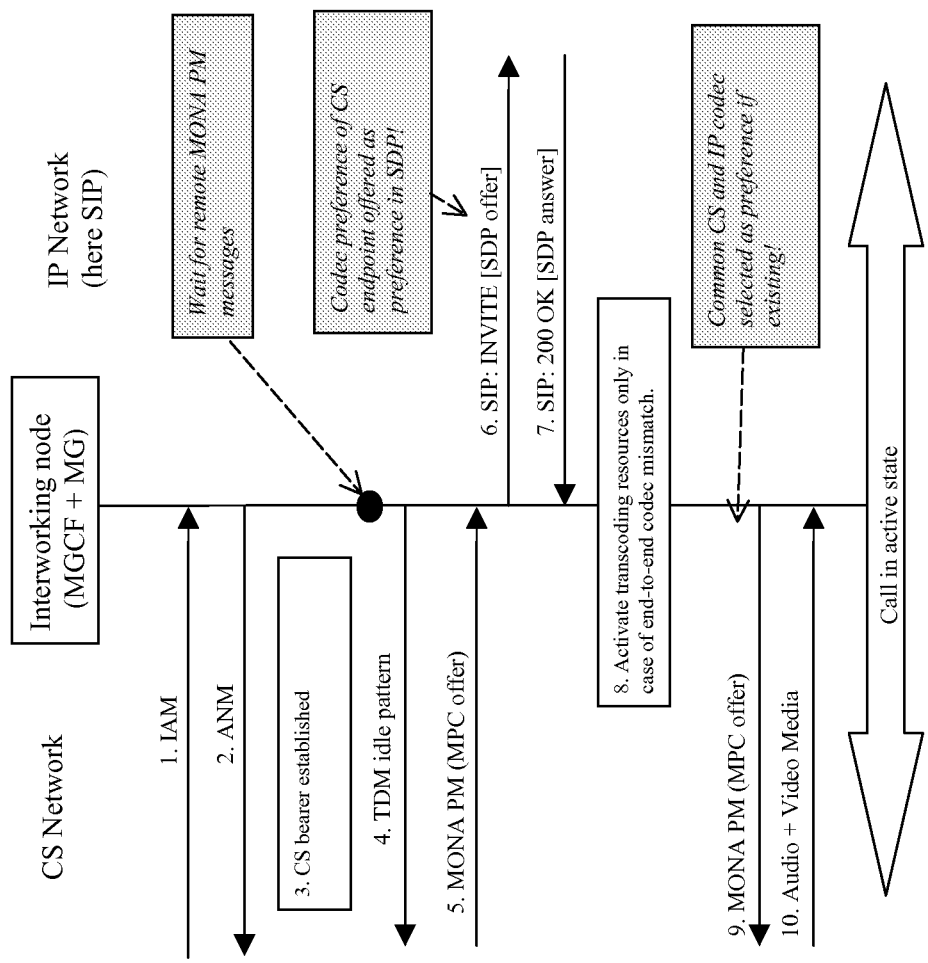
FIG. 8 illustrates a CS to IP call establishment example sequence using MONA MPC according to an embodiment of the present invention.

FIG. 8 illustrates an example of end-to-end codec negotiation using MONA MPC. The sequence starts at 1. with the CS endpoint sending an IAM to the Interworking Node. The Interworking Node responds with an ANM (2.) to the CS terminal. Next, a CS bearer is established (3.). The Interworking Node then waits for remote MONA PM messages from the CS endpoint, i.e. does not immediately proceed with IP negotiation. While the Interworking Node waits for remote MONA PM messages it continues to send an idle pattern to the CS endpoint on the TDM circuit (4.). When the Interworking Node has received (5.) a MONA PM message (in this case an MPC offer), which includes an indication of the codec capability of the CS endpoint, the Interworking Node starts the negotiation on the IP side by sending (6.) a SIP invite message to the IP terminal. This SIP invite message includes an SDP offer, which comprises the codec preference of the CS endpoint. In this way the codec preference (and capability) of the CS endpoint can be taken into account during the negotiation between the Interworking Node and the IP endpoint. The IP endpoint then sends (7.) a SIP 200 OK (i.e. the SDP answer) to the Interworking Node. As a result, codecs are selected which are suitable both for the CS and IP side, i.e. in accordance with the capabilities of the CS terminal and the IP terminal (if such common codecs exist).

The Interworking Node then sends (9.) a MONA PM message (i.e. an MPC offer) to the CS terminal. If a codec exists which is common to both the CS endpoint and the IP endpoint then this is selected as a preference.

The CS terminal then sends (10.) audio and video media to the Interworking Node. Active transcoding resources of the Interworking Node are only used (8.) in case of end-to-end codec mismatch.

It can hence be seen that the second embodiment aims to provide end-to-end codec negotiation between the end points. This is achieved by deliberately delaying H. 223/MONA negotiation until the codec capabilities and preferences of both the CS and the IP endpoints are known. Once this information is available the Interworking Node can make an MPC offer with the best common codec resulting in highest possible media quality.

In the above technique, the Interworking Node emulates a media inactive CS bearer by sending an idle pattern on the TDM circuit during the time it takes to discover the capabilities of both the MONA and the IP endpoint.

As an alternative to the above second embodiment, the technique according to the first embodiment can also be used in the case of MONA MPC as a mechanism to wait for the remote endpoint to expose its capability before initiating negotiation with the IP endpoint. It will be clear to one skilled in the art, on considering the present specification, how the technique of the first embodiment would need to be modified so as to be suitable for use with MONA MPC.

In case the initial data received (at 5.) from the remote CS endpoint indicates legacy signalling, then fallback to legacy is performed.

Embodiment 3 (Using MONA ACP)

This embodiment can be used as an alternative to embodiments 1 or 2, in particular if the technique according to embodiments 1 and 2 cannot be used for any reason.

According to the third embodiment the Interworking Node ensures that ACP is used as procedure to establish CS channels. The Interworking Node achieves this by triggering a fallback condition to be detected by the remote MONA terminal. According to this embodiment the fallback condition to ACP depends on the MONA terminal type which the remote MONA terminal acts as. The Interworking Node is able to adapt and act depending on the remote terminal type.

Figure 9:
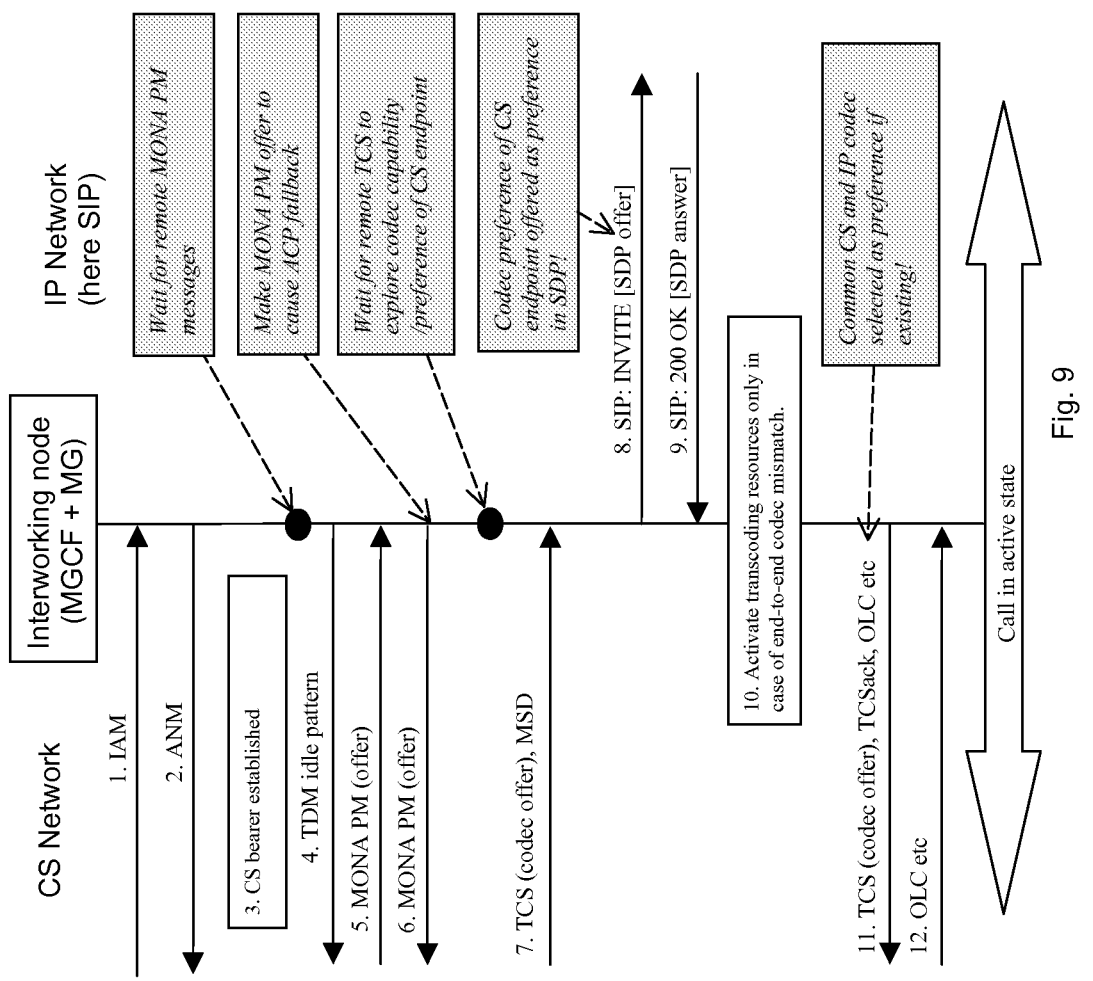
FIG. 9 illustrates a CS to IP call establishment example sequence using MONA ACP according to an embodiment of the present invention.

Referring to FIG. 9, GW initiation of H.223 and MONA is delayed in order to explore the terminal type of the CS endpoint and optionally its codec preference, as in the second embodiment (1. to 4.). As shown at 5., the CS endpoint then sends a MONA PM. The Interworking Node then sends (6.) a MONA PM offer which deliberately causes fallback to ACP.

The nature of the MONA PM offer sent by the Interworking Node depends on the type of MONA terminal of the CS endpoint as detected by the Interworking Node based on the MONA PM offer sent by the CS endpoint to the Interworking Node.

If the remote MONA terminal is of type II (i.e. it supports MPC but not SPC), then the Interworking Node emulates a type III terminal by sending a PM message at 6. indicating SPC support without any MPC codec offer (i.e. MPC-RX/TX bits set to value zero). In addition the Interworking Node may send a MOS request in order to be standard compliant.

If the remote MONA terminal is of type III (i.e. SPC is supported, but not MPC), then the Interworking Node emulates a type II terminal by sending a MPC codec offer and also a PM message indicating no support for SPC.

If the remote MONA terminal is of type I (i.e. MPC and SPC supported), then the Interworking Node will emulate a type II terminal by making an MPC offer which may be an inverted copy of the MPC offer received from the remote MONA terminal, or which is otherwise incompatible (e.g. such that the codecs supported by the CS endpoint are unsupported by the Interworking Node).

The Interworking Node then waits for receipt of a TCS from the remote CS endpoint to explore the codec capability/preference of the CS endpoint.

IP codec negotiation starts once the TCS from the remote MONA terminal has been received (7.). In the IP codec negotiation the Interworking Node uses the codec preference of the MONA terminal as preference towards the IP terminal by sending (8.) the codec preference of the CS endpoint as preference in an SDP offer. The IP terminal responds (9.) by sending an SDP answer, which will include an indication of the codec capability and/or preference of the IP terminal.

Active transcoding resources of the Interworking Node are only used (10.) in case of end-to-end codec mismatch.

With the codec capability of the IP terminal being known, the Interworking Node sends (11.) a TCS codec offer to the MONA terminal. This TCS codec offer includes the best possible codecs with highest media quality that both endpoints (the MONA and IP terminals) have in common, if such a common codec exists. If no such common codec exists, then the offer would include a codec for which the Interworking Node has transcoding capabilities.

The remote MONA terminal then sends (12.) an OLC.

It will hence be understood that in the third embodiment the MONA offering is dynamically adapted based on the received remote MONA offer/the terminal type of the remote MONA terminal. Further, in the third embodiment the remote terminal is deliberately forced to fallback to ACP as a means to achieve end-to-end codec negotiation in CS to IP calls.

By way of summary, in the second and third embodiments the sending of a TDM idle pattern until the remote offer has been received enables the remote MONA CS terminal capability (and preferably also the IP terminal capabilities) to be explored before MONA negotiation is initiated.

From the above description it may be appreciated that preferred embodiments of the invention may minimize call signalling on both the CS and the IP side as well as between the MGCF 4 and the MG 5. Further, call setup time for CS-IP interworking calls may be reduced.

| List of Abbreviations | |
| --- | --- |
| ACK | Acknowledgement |
| ACP | Accelerated Call Procedure |
| AMR | Adaptive multi-rate |
| AMR-NB | Adaptive multi-rate - NarrowBand |
| AMR-WB | Adaptive multi-rate - WideBand |
| ANM | Answer Message |
| CCSRL | Control Channel Segmentation and Reassembly Layer |
| CS | Circuit Switched |
| 3GPP | Third Generation Partnership Project |
| IAM | Initial Address Message |
| ICM | Inferred Common Mode |
| IMS | IP Multimedia Subsystem |
| IP | Internet Protocol |
| ITU | International Telecommunication Union |
| LAPM | Link Access Procedure for Modems |
| MG | Media Gateway |
| MGCF | Media Gateway Control Function |
| MONA | Media Oriented Negotiation Acceleration |
| MOS | Media Oriented Setup |
| MPC | Media Preconfigured Channel |
| MPEG | Motion Picture Expert Group |
| MSD | Master Slave Determination |
| NSRP | Numbered Simple Retransmission Protocol |
| OLC | Open Logical Channel (the name of an ACP and H.245 message) |
| PM | Preference Message |
| RAN | Radio Access Network |
| RTD | Round-Trip Delay |
| RTP | Real time Transport Protocol |
| RTSP | Real Time Streaming Protocol |
| SDP | Session Description Protocol |
| SIP | Session Initiation Protocol |
| SPC | Signalling Preconfigured Channel |
| TCS | Terminal Capability Set |
| TS | Technical Specification |
| WNSRP | Windowed NSRP |

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of interworking Circuit Switched (CS) video calls with video calls using Internet Protocol (IP) multimedia protocols, comprising:
at an interworking function, receiving signaling comprising an indication of a codec capability of a CS terminal involved in the CS video call, as part of a Media Oriented Negotiation Acceleration (MONA) negotiation;
thereafter initiating IP codec negotiation; and
thereafter continuing and/or completing the MONA negotiation.

2. A method of interworking Circuit Switched (CS) video calls with video calls using Internet Protocol (IP) multimedia protocols, the method comprising end-to-end codec negotiation, wherein the end-to-end codec negotiation comprises:
at an interworking function, receiving signaling comprising an indication of a codec capability of a CS terminal involved in the CS video call, as part of a Media Oriented Negotiation Acceleration (MONA) negotiation; and
thereafter initiating IP codec negotiation.

3. The method according to claim 1, wherein the signaling comprises an indication of a codec preference of the CS terminal.

4. The method according to claim 2, wherein the IP codec negotiation comprises the interworking function negotiating with an IP endpoint which codecs should be used for a particular call.

5. The method according to claim 4, wherein the interworking function negotiating with the IP endpoint which codecs should be used comprises taking into account the codec capability or, where available, a codec preference of the CS terminal.

6. The method according to claim 2, further comprising establishing a CS bearer before receiving the signaling.

7. The method according to claim 2, wherein the method is tolerant to a delay caused by the IP codec negotiation.

8. The method according to claim 2, wherein the signaling comprises a Signaling Preconfigured Channel (SPC) Media Oriented Setup (MOS) request, and the MONA negotiation comprises an SPC negotiation.

9. The method according to claim 8, wherein receipt of an acknowledgement of the SPC MOS request causes the SPC negotiation to be considered to be ongoing.

10. The method according to claim 8, wherein receipt of an acknowledgement of the SPC MOS request causes a fallback to a procedure other than the SPC negotiation to be inhibited or deferred.

11. The method according to claim 1, wherein the signaling comprises a MONA Preference Message (PM).

12. The method according to claim 11, wherein the signaling comprises Media Preconfigured Channel (MPC) offer, and the MONA negotiation comprises an MPC negotiation.

13. The method according to claim 12, wherein receipt of an acknowledgement of the MPC offer causes the MPC negotiation to be considered to be ongoing.

14. The method according to claim 12, wherein receipt of an acknowledgement of the MPC offer causes a fallback to a procedure other than the MPC negotiation to be inhibited or deferred.

15. The method according to claim 12, further comprising sending a Time Division Multiplexing (TDM) idle pattern towards the CS terminal on receipt of the MPC offer at the interworking function.

16. The method according to claim 11, further comprising detecting from the signaling a type of MONA terminal which the CS terminal acts as.

17. The method according to claim 11, further comprising causing a fallback to an Accelerated Call Procedure (ACP).

18. The method according to claim 17, wherein causing the fallback to the ACP comprises the interworking function sending a MONA PM offer towards the CS terminal.

19. The method according to claim 18, wherein the MONA PM sent by the interworking function towards the CS terminal in order to cause the fallback to the ACP indicates Signaling Preconfigured Channel (SPC) support without any MPC offer.

20. The method according to claim 18, wherein the MONA PM sent by the interworking function towards the CS terminal in order to cause the fallback to the ACP comprises an MPC offer without indicating support or the SPC.

21. The method according to claim 18, wherein the MONA PM sent by the interworking function towards the CS terminal in order to cause the fallback to the ACP comprises an MPC offer which is an inverted copy of an MPC offer comprised in the signaling.

22. The method according to claim 11, wherein the interworking function sends to the CS terminal an indication of the codec to be used for a particular call only after the internetworking function has received an indication of the codec capability of the CS terminal as part of the IP codec negotiation.

23. An apparatus for enabling interworking of Circuit Switched (CS) video calls with video calls using Internet Protocol (IP) multimedia protocols, wherein the apparatus is arranged to:
receive signaling comprising an indication of a codec capability of a CS terminal involved in the CS video call, as part of a Media Oriented Negotiation Acceleration (MONA) negotiation;
thereafter initiate IP codec negotiation; and
thereafter continue and/or complete the MONA negotiation.

24. An apparatus for enabling interworking of Circuit Switched (CS) video calls with video calls using Internet Protocol (IP) multimedia protocols, the apparatus being arranged to support end-to-end codec negotiation, wherein the apparatus is arranged to:
receive signaling comprising an indication of a codec capability of a CS terminal involved in the CS video call, as part of a Media Oriented Negotiation Acceleration (MONA) MONA negotiation; and
thereafter initiate IP codec negotiation.

25. The apparatus according to claim 24, wherein the apparatus comprises an interworking function.

26. The apparatus according to claim 24, wherein the apparatus comprises means for delaying a sending to the CS terminal of an indication of codecs to be used for a particular call.

27. The apparatus according to claim 26, wherein the means for delaying is arranged to send to the CS terminal the indication of the codecs to be used for the particular call only after the means for delaying has received an indication of the codec capability of the CS terminal as part of the IP codec negotiation.

28. A terminal for use in a telecommunication system, the terminal being able to support a Media Oriented Negotiation Acceleration (MONA) Signaling Preconfigured Channel (SPC) negotiation, wherein the terminal comprises means for preventing, delaying or inhibiting a fallback to a call establishment mechanism other than SPC, at least for a first period of time, under specified conditions, wherein the fallback would not be prevented, delayed or inhibited in the absence of the means.

29. A terminal for use in a telecommunication system, the terminal being able to support Media Oriented Negotiation Acceleration (MONA) Signaling Preconfigured Channel (SPC) negotiation, wherein the terminal is arranged, when one or more first conditions are met, to cause, initiate or perform a fallback to a call establishment mechanism other than SPC, wherein the terminal comprises means for preventing, delaying or inhibiting the fallback, at least for a first period of time, when one or more second conditions are met despite the one or more first conditions being met.

30. A terminal for use in a telecommunication system, the terminal being able to support Media Oriented Negotiation Acceleration (MONA) Signaling Preconfigured Channel (SPC) negotiation, wherein, when one or more conditions are met, the terminal is arranged to initiate fallback to a call establishment mechanism other than SPC, wherein the terminal is arranged not to initiate the fallback, at least for a first period of time, when the terminal has received a valid Media Oriented Setup (MOS) requestAck message.

31. The terminal according to claim 30, wherein the terminal is arranged not to initiate the fallback when the terminal has received a valid MOS requestAck message despite one or more other fallback conditions being fulfilled.

32. The terminal according to claim 30, wherein the terminal is arranged to delay the sending of an acknowledgement of a MONA Preference Message so as to prevent, delay or inhibit a fallback to a call establishment mechanism other than SPC, at least for a first period of time.

33. The terminal of claim 30, wherein the terminal is arranged to send signaling indicative of that the MONA SPC negotiation has been established/initiated and that a first MONA offer is pending.

34. The terminal of claim 30, wherein the terminal is arranged to receive signaling indicative of the MONA SPC negotiation being established and that a first offer is pending, wherein, on receipt of such signaling, the terminal is arranged to prevent, delay or inhibit a fallback to a call establishment mechanism other than SPC, at least for a first period of time.

35. A method of operating a terminal for use in a telecommunication system, the terminal being able to support a Media Oriented Negotiation Acceleration (MONA) Signaling Preconfigured Channel (SPC) negotiation, wherein the method comprises:
- the terminal causing, initiating or performing a fallback to a call establishment mechanism other than SPC when one or more first conditions are met, and
- the terminal preventing, delaying or inhibiting a the fallback, at least for a first period of time, when one or more second conditions are met despite the one or more first conditions being met.

36. A method of operating a terminal for use in a telecommunication system, the terminal being able to support a Media Oriented Negotiation Acceleration (MONA) Signaling Preconfigured Channel (SPC) negotiation, wherein, when one or more conditions are met, the terminal is arranged to initiate fallback to a call establishment mechanism other than SPC, wherein the method comprises:
- the terminal not initiating the fallback, at least for a first period of time, when the terminal has received a valid Media Oriented Setup (MOS) requestAck message.

37. The method according to claim 36, wherein the terminal does not initiate the fallback when the terminal has received a valid MOS requestAck message despite one or more other fallback conditions being fulfilled.

38. The method according to claim 36, further comprising:
- the terminal delaying the sending of an acknowledgement of a MONA Preference Message so as to prevent, delay or inhibit a fallback to a call establishment mechanism other than SPC, at least for a first period of time.

39. The method according to claim 36, further comprising:
- the terminal sending signaling indicative of the MONA SPC negotiation being established and that a first MONA offer is pending.

40. The method according to claim 36, further comprising:
- the terminal receiving signaling indicative of the MONA SPC negotiation being established and that a first MONA offer is pending, wherein, on receipt of such signaling, the terminal prevents, delays or inhibits a fallback to a call establishment mechanism other than SPC, at least for a first period of time.

41. The method according to claim 36, further comprising:
- defining a Round-Trip Delay based on a time until a MONA Preference Message (PM) acknowledgment is received.

* * * * *

UNITED STATES PATENT AND TRADEMARK OFFICE
CERTIFICATE OF CORRECTION

| | | |
|---|---|---|
| PATENT NO. | : 8,502,855 B2 | Page 1 of 1 |
| APPLICATION NO. | : 12/597711 | |
| DATED | : August 6, 2013 | |
| INVENTOR(S) | : Lindstrom et al. | |

It is certified that error appears in the above-identified patent and that said Letters Patent is hereby corrected as shown below:

In the Specification

In Column 7, Line 47, delete "1." and insert -- 1, --, therefor.

In the Claims

In Column 13, Line 43, in Claim 20, delete "or" and insert -- for --, therefor.

In Column 13, Lines 51-52, in Claim 22, delete "internetworking" and insert -- interworking --, therefor.

In Column 14, Line 7, in Claim 24, delete "(MONA) MONA" and insert -- (MONA) --, therefor.

In Column 15, Line 9, in Claim 35, delete "a the" and insert -- the --, therefor.

Signed and Sealed this
Thirty-first Day of December, 2013

Margaret A. Focarino
*Commissioner for Patents of the United States Patent and Trademark Office*